United States Patent
Sundaram et al.

(10) Patent No.: US 12,088,615 B2
(45) Date of Patent: Sep. 10, 2024

(54) METHOD AND SYSTEM FOR AUTOMATED PROTECTION AGAINST VULNERABILITY AND NOTIFICATION TO SERVICE PROVIDER

(71) Applicant: ARRIS Enterprises LLC, Suwanee, GA (US)

(72) Inventors: Sudha Sundaram, Bangalore (IN); Vinod S. Jatti, Bangalore Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 620 days.

(21) Appl. No.: 17/229,148

(22) Filed: Apr. 13, 2021

(65) Prior Publication Data

US 2021/0409438 A1    Dec. 30, 2021

Related U.S. Application Data

(60) Provisional application No. 63/046,588, filed on Jun. 30, 2020.

(51) Int. Cl.
*H04L 9/40* (2022.01)

(52) U.S. Cl.
CPC ...... *H04L 63/1433* (2013.01); *H04L 63/0876* (2013.01); *H04L 63/1416* (2013.01); *H04L 63/1425* (2013.01); *H04L 63/20* (2013.01)

(58) Field of Classification Search
CPC .......... H04L 63/1433; H04L 63/0876; H04L 63/1416; H04L 63/1425; H04L 63/20
USPC .......................................................... 726/22
See application file for complete search history.

(56) References Cited

U.S. PATENT DOCUMENTS

| | | | | |
|---|---|---|---|---|
| 8,150,039 | B2* | 4/2012 | de Cesare | G06F 21/575 380/278 |
| 2009/0257595 | A1* | 10/2009 | de Cesare | G06F 21/575 726/16 |
| 2014/0215226 | A1* | 7/2014 | Litty | G06F 21/53 713/193 |
| 2020/0007385 | A1* | 1/2020 | Obaidi | H04L 63/1425 |

* cited by examiner

*Primary Examiner* — Teshome Hailu
(74) *Attorney, Agent, or Firm* — Panitch Schwarze Belisario & Nadel LLC

(57) ABSTRACT

A method and system are disclosed for automated utilization of vulnerability databases for consumer electronic (CE) devices. The method includes deploying one or more customer-premise equipment or customer-provided equipment (CPE) broadband devices, each of the one or more broadband devices having one or more software components; loading a database of software component on each of the one or more broadband devices, the database of software components having a functional use case associated with each software component; periodically performing an automated reading of one or more published vulnerability databases; and comparing a list of vulnerabilities from the one or more published vulnerability databases against the database of software components for each of the one or more broadband devices.

20 Claims, 3 Drawing Sheets

METHOD AND SYSTEM FOR AUTOMATED PROTECTION AGAINST VULNERABILITY AND NOTIFICATION TO SERVICE PROVIDER

TECHNICAL FIELD

The present disclosure generally relates generally to a method and system for automated protection against vulnerability and notification to service providers, and more particularly to a method and system for automated utilization of vulnerability databases for consumer electronic (CE) devices to detect if any software component version is unsafe and provide for self-protection until a software fix can be provided.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

Subscribers connect their computers, routers, voice-over-IP telephones and other devices to this network through the network terminals, for example, cable modems (CM) or network gateways. The network terminals, for example, cable modems (CM) or network gateways include hardware which runs software that provides the low-level control for the device's specific hardware, which is known as firmware, which can be updated by pushing a new firmware version (or image) from time to time to the network gateway, for example, the cable modem (CM) or gateway.

With evolving technology, a number of skilled and well-organized consumer electronic (CE) device hacking groups are also growing. As cable service providers have a wide range of products both in-home and enterprise, there products require protection from vulnerability. For example, the software on these products can include, for example, open source software, 3rd party software, 3rd party vendor software, and/or in-house developed code. When new vulnerabilities are detected, field deployed devices can be prone to vulnerability till the devices are upgraded with the software fix. Central repositories are known which maintain details about latest vulnerabilities. However, automated process of understanding whether the newly identified vulnerability is applicable to device are not typically maintained.

For example, OpenSSL is an open source library which is used by a number of consumer electronic (CE) devices (or customer-premise equipment or customer-provided equipment (CPE) broadband devices). For example, if a version of OpenSSL say 1.0.2 version is found to be vulnerable, there is currently no automated way to understand about what device components or functionalities use OpenSSL and what the version is being used in each of the devices. In addition, there are public vulnerability databases, for example, https://nvd.nist.gov/ (national vulnerability database), which are available and maintains a list of the latest vulnerabilities and software interfaces to capture the latest vulnerabilities.

SUMMARY

In accordance with exemplary embodiments, it would be desirable an automated method of utilizing vulnerability databases for consumer electronic (CE) devices to detect if any software component version is unsafe and an automated way of self-protection till the software fix can be provided. In addition, it would be desirable, that the service provider is notified about the detected vulnerability being applicable to device along with details.

In accordance with an aspect, a method for automated utilization of vulnerability databases for consumer electronic (CE) devices, the method comprising: deploying one or more customer-premise equipment or customer-provided equipment (CPE) broadband devices, each of the one or more broadband devices having one or more software components; loading a database of software component on each of the one or more broadband devices, the database of software components having a functional use case associated with each software component; periodically performing an automated reading of one or more published vulnerability databases; and comparing a list of vulnerabilities from the one or more published vulnerability databases against the database of software components for each of the one or more broadband devices.

In accordance with an another aspect, a system for automated utilization of vulnerability databases for consumer electronic (CE) devices, the method comprising: one or more customer-premise equipment or customer-provided equipment (CPE) broadband devices, each of the one or more broadband devices having one or more software components, and wherein each of the one or more broadband devices has a database of software components, the database of software components having a functional use case associated with each software component; and a cable service provider, the cable service provider having a processor configured to: periodically perform an automated reading of one or more published vulnerability databases; and send a list of vulnerabilities from the one or more published vulnerability databases to the one or more broadband devices for the one or more broadband devices to check the list of vulnerabilities from the one or more published vulnerability databases against the database of software components on each of the one or more broadband devices.

DETAILED DESCRIPTION

System for Automated Utilization of Vulnerability Databases

Figure 1:
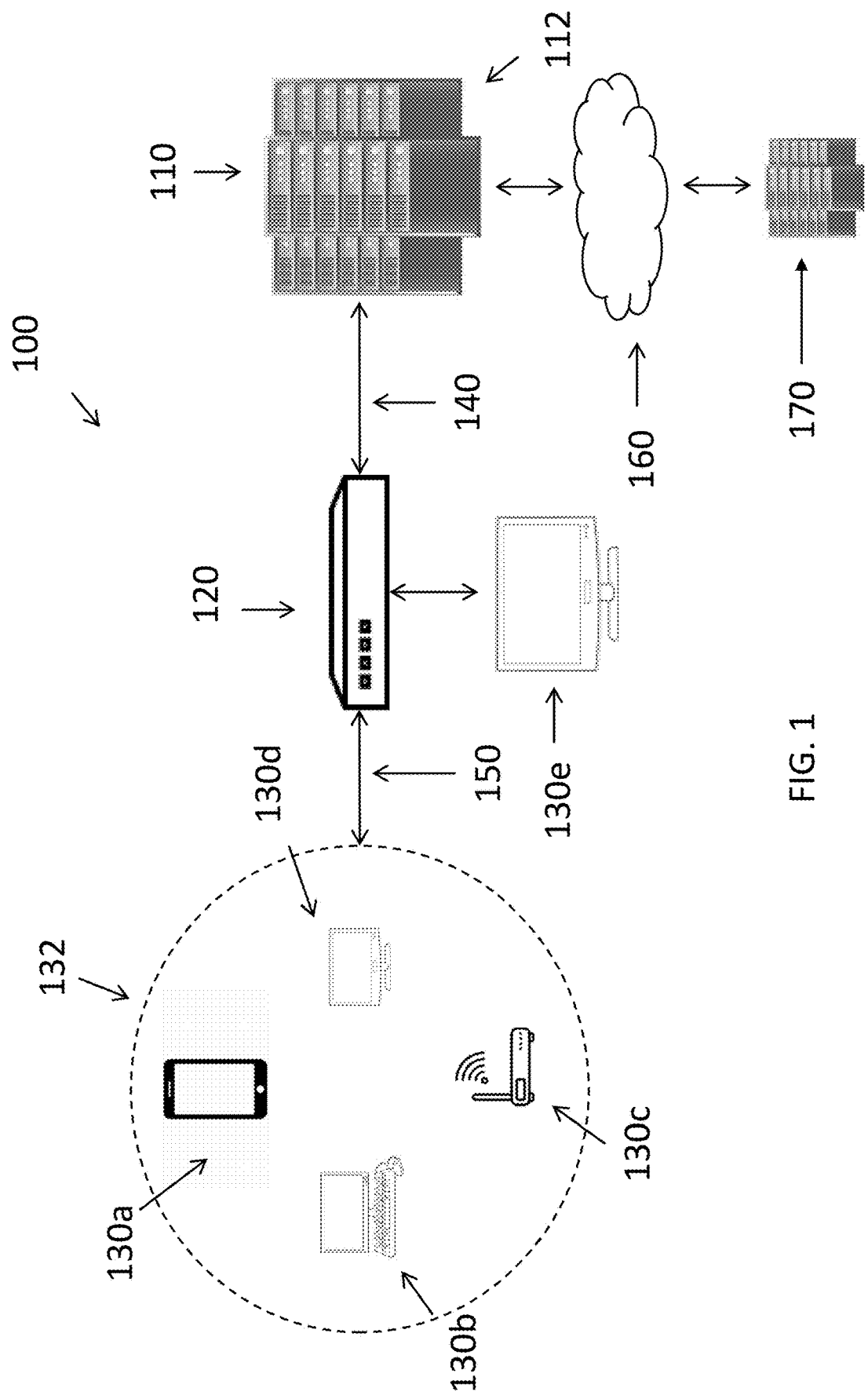
FIG. 1 is an illustration of an exemplary network environment for a system and method for automated utilization of vulnerability databases for consumer electronic (CE) devices to detect if any software component version is unsafe and provides for self-protection until the software fix can be provided.

FIG. 1 is a block diagram illustrating an example network environment 10 automated utilization of vulnerability databases for consumer electronic (CE) devices to detect if any software component version is unsafe and provides for self-protection until the software fix can be provided. In embodiments, a network gateway 120 can provide, for example, video and/or data services to a plurality of devices 130a, 130b, 130c, 130d, 130e. The network gateway 120 may communicate with the plurality of devices 130a, 30b, 130c, 130d over a local network 132 (for example, a local area network (LAN), a wireless local area network (WLAN), a personal area network (PAN), etc.) and/or wired, for example, a television 130e connected to a modem, and may communicate with an upstream wide area network (WAN) 160 through a connection 150 to a cable provider 110. The cable provider 110 can provide high-bandwidth data transfer, for example, cable television and broadband internet access via, for example, coaxial cables 140. The cable provider 110 can include one or more servers 112 configured to deliver services, for example, cable television and/or broadband internet and infrastructure supporting such services including management of image software and/or firmware.

In accordance with an exemplary embodiment, the network gateway 120 and the plurality of devices 130a, 130b, 130c, 130d, 130e are field devices, or customer-premise equipment or customer-provided equipment (CPE) broadband devices. The plurality of devices 130a, 130b, 130c, 130d, 130e may be any type of computing device configured to connect via a wireless network, for example, wireless network utilizing an IEEE 802.11 specification, including a set-top box (STB), a smart phone, a smart TV, a computer, a mobile device, a tablet, a router, a home security system, or any other device operable to communicate wirelessly with the network gateway 120. The network gateway 120 may provide access to an external network, such as the Internet, for any devices connected thereto via the area network 132. The area network 132 may be, for instance a local area. In accordance with an exemplary embodiment, the network gateway 120 may be a gateway device, an access point, a modem, a wireless router including an embedded modem, a wireless network extender or any other device operable to deliver, for example, data and/or video services from the provider 110 and/or a wide area network (WAN) 160 to one or more of the plurality of devices 130a, 130b, 130c, 130d, 130e.

In accordance with an exemplary embodiment, the network gateway 120 may communicate with the provider 110 over a wired or a wireless connection. A wireless connection between the provider 110 and the network gateway 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Process for Automated Utilization of Vulnerability Databases

Figure 2:
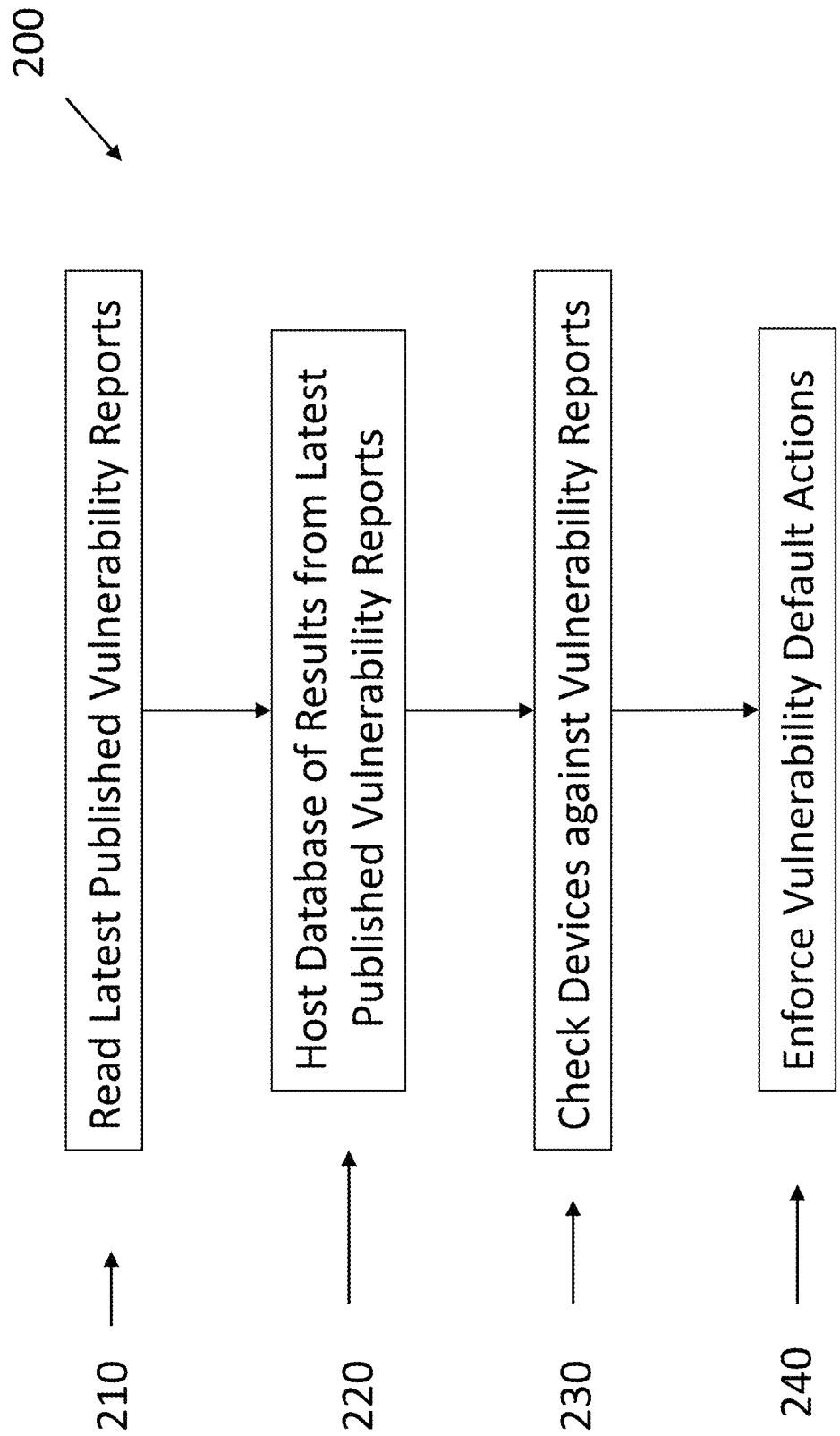
FIG. 2 is a flowchart illustrating an exemplary method for automated utilization of vulnerability databases for consumer electronic (CE) devices in accordance with an exemplary embodiment.

FIG. 2 is a flowchart 200 illustrating an exemplary method for automated utilization of vulnerability databases for consumer electronic (CE) devices 120, 130a, 130b, 130c, 130d, 130e in accordance with an exemplary embodiment. As set forth above, many governing bodies publish the details about latest vulnerability found in specific software component and version it is applicable, severity etc. However, there is no automated way to match it against device components version and confirm is device applicable to such vulnerability. For example, field deployed consumer electronic (CE) devices 120, 130a, 130b, 130c, 130d, 130e can include various software components (open source+3$^{rd}$ party software+in-house software). When any of the software component is vulnerable, then the device 120, 130a, 130b, 130c, 130d, 130e may be under threat until a newer version of that component is upgraded. For example, if OpenSSL version 1.0.1 is found be vulnerable, and a fix is available in 1.0.2, and the device 120, 130a, 130b, 130c, 130d, 130e is using a previous version, for example, 1.0.1, then the device 120, 130a, 130b, 130c, 130d, 130e is under threat until the device 120, 130a, 130b, 130c, 130d, 130e is upgraded to version 1.0.2.

In addition, there is no automated way to notify a manufacturer of a device 120, 130a, 130b, 130c, 130d, 130e or service provider 110 about the latest vulnerability being applicable to a specific product model. If the service providers 110 or the manufacturers of the device 120, 130a, 130b, 130c, 130d, 130e want to periodically check if any of the device software component are prone to vulnerability, it can be tedious manual work since it may require maintaining a catalog of software components version being used in various product lines and comparing or matching it against the list of latest published vulnerabilities.

In accordance with an exemplary embodiment, a system and method is disclosed that periodic performs automated reading of the lasted published vulnerability databases and check the listed vulnerabilities against applicability to devices 120, 130a, 130b, 130c, 130d, 130e and performs a use case impact analysis and highlights areas going to be impacted on each of the one or more devices 120, 130a, 130b, 130c, 130d, 130e.

In accordance with an exemplary embodiment, the device 120, 130a, 130b, 130c, 130d, 130e can be preloaded with a catalog (or database) of software component (library or utilities) versus device functional use cases associated with each software component. Each functional use cases can be tagged with additional details, for example, whether software component supports safe mode execution, recommended actions against level (for example, High/Medium/Low) of vulnerability, etc.

In accordance with an exemplary embodiment, vulnerability monitoring process can be a timely routine which gets triggered, for example, every night (or period of time) when the device 120, 130a, 130b, 130c, 130d, 130e is likely in standby mode or as default configured time. In accordance with an exemplary embodiment, the vulnerability monitoring process begin in step 210, wherein the latest published vulnerability information 170 (FIG. 1), for example, from a governing body can be read (i.e., retrieved), for example, https://nvd.nist.gov/. In accordance with an exemplary embodiment, a service provider 110 or manufacturer of the device 120, 130a, 130b, 130c, 130d, 130e can choose, for example, in step 220, to host the latest vulnerability information on an in-house cloud server and/or in-house server 112.

In accordance with an exemplary embodiment, in step 230, the device 120, 130a, 130b, 130c, 130d, 130e is checked to determine if the published vulnerability component is present in the device software catalog, the process continues to step 240, where a precautionary action to safeguard devices against vulnerability is performed.

In accordance with an exemplary embodiment, for example, the actions to be taken can differ from one functional use case to other, and the differences can be also based on severity of vulnerability. For example, decision of default actions per each functional use case and per each severity level are pre-loaded as part of, for example, a device software catalog. In accordance with an exemplary embodiment, in step 240, the vulnerability monitoring process reads each of the catalog for the affected functional use case and fetches (retrieves) default actions for matching severity level and enforce the action. In accordance with an exemplary embodiment, actions can be no action, a single action, or multiple actions as recommended in the catalog. The catalog can be maintained, for example, by the service provider 110 or the manufacturer of the device 120, 130a, 130b, 130c, 130d, 130e. In addition, catalogs can undergo change or be revised dynamically by the service provider 110 or the manufacturer of the device 120, 130a, 130b, 130c, 130d, 130e, for example, as needed.

In accordance with an exemplary embodiment, the following are examples of individual actions and corresponding logic for the implementation of the corresponding individual actions. For example, if the functional use case has support of safe-mode execution, then it can be recommended to enable safe-mode for that specific functionality or use case on the device 120, 130a, 130b, 130c, 130d, 130e, rather than blocking the device's functionality. For example, the safe-mode execution can be a mode of operation by application software on the device that only allows essential system programs and services to start up at boot.

In accordance with an exemplary embodiment, if the functionality or use case does not have safe-mode support, the severity of the vulnerability is checked. If the severity of the published vulnerability is relatively high (for example, the vulnerability to the device is critical), then associated device functional use cases can be marked as "Blocked". Alternatively, if the severity is rather low and associated device functional use cases are related to platform service or security service like digital rights management (DRM), then functional use cases can be marked as 'Blocked', and associated device functionalities can execute and ignore the vulnerability.

For example, suppose Netflix TTS (text to speech) library or engine is published as vulnerable (severity label is high) and service provider recommend in catalog that default action as disabled. In accordance with an exemplary embodiment, the Netflix TTS option can be disabled to the customer. Whereas other Netflix functionalities, for example content playback or browsing are unaffected and the customer is allowed to use these Netflix functionalities. In accordance with an exemplary embodiment, the blocked functionality can only be enabled after device software has been upgraded with the fixed version. In accordance with an exemplary embodiment, for all the device functional use case marked as blocked, action can be taken immediately by blocking those functionalities and making these device functional use cases being unavailable to the customer via the device 120, 130a, 130b, 130c, 130d, 130e until the service provider upgrades the device 120, 130a, 130b, 130c, 130d, 130e with a fix. For example, for all devices 120, 130a, 130b, 130c, 130d, 130e in which the functional use case is marked as 'safe-mode', action can be taken immediately by enabling safe mode execution of functional use case module.

In accordance with an exemplary embodiment, the safe mode can include input and output data with vulnerable software components undergoing security checks. For example, data header or payload fields can be checked against valid ranges. If interface is over network socket, then socket data can undergo a security check to confirm valid data format (for example, network port hardening). In accordance with an exemplary embodiment, through data security check can also be performed to help protect the device 120, 130a, 130b, 130c, 130d, 130e against vulnerability. As part of functional use cases getting blocked, associated device resources like network sockets, hardware components etc. can be uninitialized and closed, and which can be persistent across reboot.

In accordance with an exemplary embodiment, a system and method of automated notification of the vulnerability impact analysis report to a service provider or a manufacturer of a device 120, 130a, 130b, 130c, 130d, 130e is disclosed. In accordance with an exemplary embodiment, collate the following details or summary can be collated and reported to the service provider or the manufacturer of the device. For example, vulnerability details and severity and version affected and expected version, list of associated device functional use cases got blocked as precautionary action, and device and software build details In accordance with an exemplary, the system and method disclosed can include self-analysis of published vulnerability information and precautionary actions can be taken, method of auto safe guarding device against vulnerability, and automated notification to service provider about vulnerability.

Computer System Architecture

Figure 3:
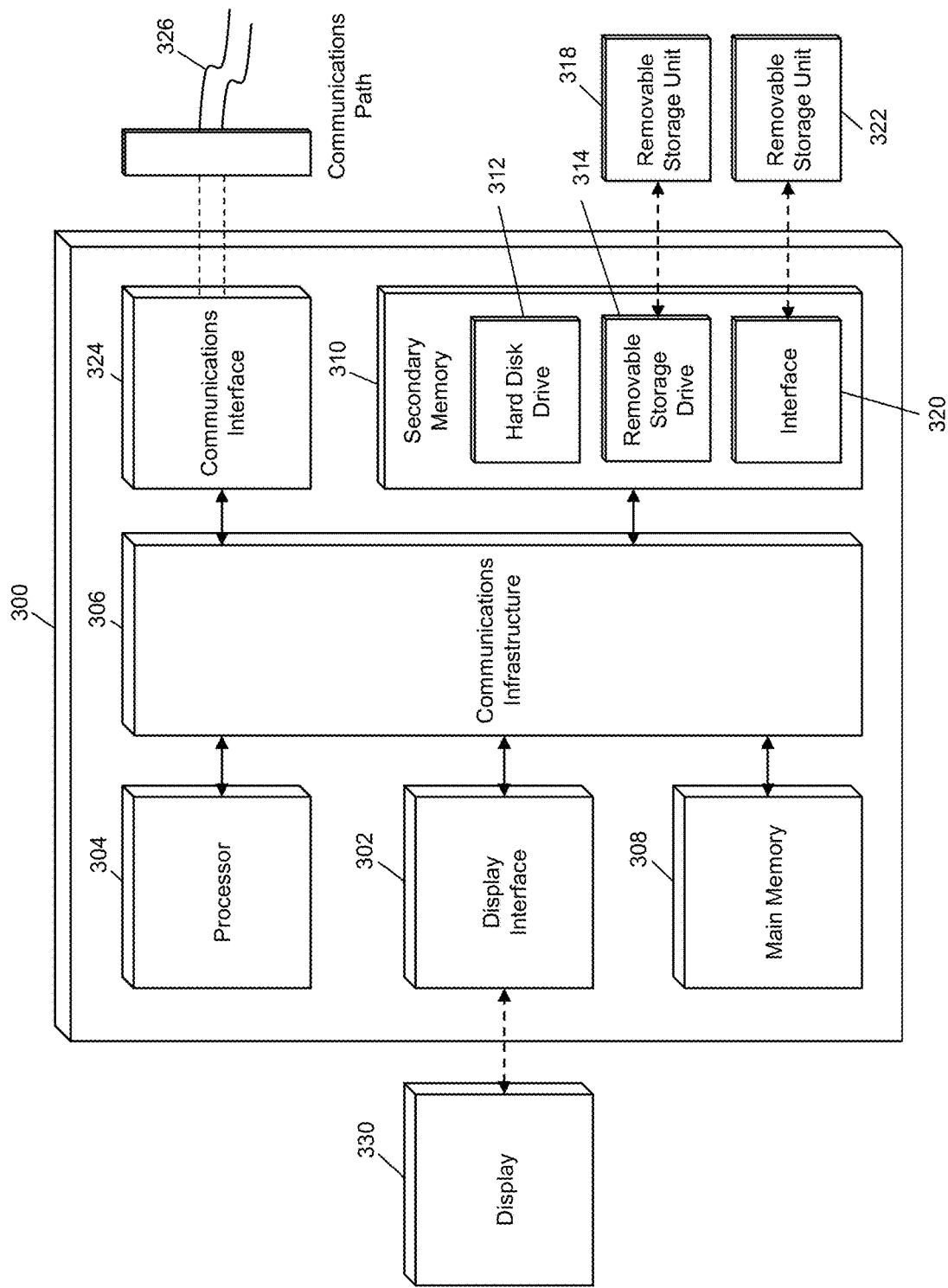
FIG. 3 is an exemplary hardware architecture for an embodiment of a communication device.

FIG. 3 illustrates a representative computer system 300 in which embodiments of the present disclosure, or portions thereof, may be implemented as computer-readable code. For example, the one or more servers 112, the network gateway 120, and the plurality of devices 130a, 130b, 130c, 130d, 130e of FIG. 1 may be implemented in whole or in part by a computer system 300 using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present invention.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 318, a removable storage unit 322, and a hard disk installed in hard disk drive 312.

Various embodiments of the present disclosure are described in terms of this representative computer system 300. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 304 may be a special purpose or a general purpose processor device specifically configured to perform the functions discussed herein. The processor device 304 may be connected to a communications infrastructure 305, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 300 may also include a main memory 308 (e.g., random access memory, read-only memory, etc.), and may also include a secondary memory 310. The secondary memory 310 may include the hard disk drive 312 and a removable storage drive 314, such as a floppy disk drive, a magnetic tape drive, an optical disk drive, a flash memory, etc.

The removable storage drive 314 may read from and/or write to the removable storage unit 318 in a well-known manner. The removable storage unit 318 may include a removable storage media that may be read by and written to by the removable storage drive 314. For example, if the removable storage drive 314 is a floppy disk drive or universal serial bus port, the removable storage unit 318 may be a floppy disk or portable flash drive, respectively. In one embodiment, the removable storage unit 318 may be non-transitory computer readable recording media.

In some embodiments, the secondary memory 310 may include alternative means for allowing computer programs or other instructions to be loaded into the computer system 300, for example, the removable storage unit 322 and an interface 320. Examples of such means may include a program cartridge and cartridge interface (e.g., as found in video game systems), a removable memory chip (e.g., EEPROM, PROM, etc.) and associated socket, and other removable storage units 322 and interfaces 320 as will be apparent to persons having skill in the relevant art.

Data stored in the computer system 300 (e.g., in the main memory 308 and/or the secondary memory 310) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 300 may also include a communications interface 324. The communications interface 324 may be configured to allow software and data to be transferred between the computer system 300 and external devices. Exemplary communications interfaces 324 may include a modem, a network interface (e.g., an Ethernet card), a communications port, a PCMCIA slot and card, etc. Software and data transferred via the communications interface 324 may be in the form of signals, which may be electronic, electromagnetic, optical, or other signals as will be apparent to persons having skill in the relevant art. The signals may travel via a communications path 326, which may be configured to carry the signals and may be implemented using wire, cable, fiber optics, a phone line, a cellular phone link, a radio frequency link, etc.

The computer system 300 may further include a display interface 302. The display interface 302 may be configured to allow data to be transferred between the computer system 300 and external display 330. Exemplary display interfaces 302 may include high-definition multimedia interface (HDMI), digital visual interface (DVI), video graphics array (VGA), etc. The display 330 may be any suitable type of display for displaying data transmitted via the display interface 302 of the computer system 300, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 308 and secondary memory 310, which may be memory semiconductors (e.g., DRAMs, etc.). These computer program products may be means for providing software to the computer system 300. Computer programs (e.g., computer control logic) may be stored in the main memory 308 and/or the secondary memory 310. Computer programs may also be received via the communications interface 324. Such computer programs, when executed, may enable computer system 300 to implement the present methods as discussed herein. In particular, the computer programs, when executed, may enable processor device 304 to implement the methods illustrated by FIGS. 1 and 2, as discussed herein. Accordingly, such computer programs may represent controllers of the computer system 300. Where the present disclosure is implemented using software executed on hardware, the software may be stored in a computer program product and loaded into the computer system 300 using the removable storage drive 314, interface 320, and hard disk drive 312, or communications interface 324.

The processor device 304 may comprise one or more modules or engines configured to perform the functions of the computer system 300. Each of the modules or engines may be implemented using hardware and, in some instances, may also utilize software executed on hardware, such as corresponding to program code and/or programs stored in the main memory 308 or secondary memory 310. In such instances, program code may be compiled by the processor device 304 (e.g., by a compiling module or engine) prior to execution by the hardware of the computer system 300. For example, the program code may be source code written in a programming language that is translated into a lower level language, such as assembly language or machine code, for execution by the processor device 304 and/or any additional hardware components of the computer system 300. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 300 to perform the functions disclosed herein. It will be apparent to persons having skill in the relevant art that such processes result in the computer system 300 being a specially configured computer system 300 uniquely programmed to perform the functions discussed above.

Techniques consistent with the present disclosure provide, among other features, systems and methods for reducing service impact to users during image and/or firmware changes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for automated utilization of vulnerability databases for consumer electronic (CE) devices, the method comprising:
deploying one or more customer-premise equipment or customer-provided equipment (CPE) broadband devices, each of the one or more broadband devices having one or more software components;
loading a database of software component on each of the one or more broadband devices, the database of software components having a functional use case associated with each software component;
periodically performing an automated reading of one or more published vulnerability databases, the one or more published vulnerability databases being external to the one or more broadband devices; and
comparing a list of vulnerabilities from the one or more published vulnerability databases against the database of software components for each of the one or more broadband devices.

2. The method according to claim 1, further comprising:
performing a use case impact analysis for each of the one or more deployed broadband devices having one or more software components on the list of vulnerabilities from the one or more published vulnerability databases.

3. The method according to claim 1, further comprising:
preloading each of the one or more deployed broadband devices with a catalog of software components and device functional use cases associated with each software component in the catalog of software components.

4. The method according to claim 1, further comprising:
recommending that a deployed broadband device operate in a safe mode when a vulnerability is detected.

5. The method according to claim 1, further comprising:
checking the list of vulnerabilities from the one or more published vulnerability databases against the one or more software components for each of the one or more deployed broadband devices for vulnerabilities at a pre-set interval.

6. The method according to claim 5, wherein the pre-set interval is daily.

7. The method according to claim 1, wherein at least one of the one or more published vulnerability databases is a governmental national vulnerability database.

8. The method according to claim 1, further comprising:
hosting the list of vulnerabilities from the one or more published vulnerability databases on an in-house server or an in-house cloud server of a cable service provider.

9. The method according to claim 1, further comprising:
issuing a precautionary action to safeguard devices against vulnerability each of the one or more deployed broadband devices having one or more software components on the list of vulnerabilities from the one or more published vulnerability databases.

10. The method according to claim 1, wherein the one or more software components include open source software, $3^{rd}$ party software, and/or in-house software.

11. A system for automated utilization of vulnerability databases for consumer electronic (CE) devices, the system comprising:
one or more customer-premise equipment or customer-provided equipment (CPE) broadband devices, each of the one or more broadband devices having one or more software components, and wherein each of the one or more broadband devices has a database of software components, the database of software components having a functional use case associated with each software component; and
a cable service provider, the cable service provider having a processor configured to:
periodically perform an automated reading of one or more published vulnerability databases, the one or more published vulnerability databases being external to the one or more broadband devices; and
send a list of vulnerabilities from the one or more published vulnerability databases to the one or more broadband devices for the one or more broadband devices to check the list of vulnerabilities from the one or more published vulnerability databases against the database of software components on each of the one or more broadband devices.

12. The system according to claim 11, wherein the one or more broadband devices are configured to perform a use case impact analysis for each of the one or more software components on the list of vulnerabilities read from the one or more published vulnerability databases.

13. The system according to claim 11, wherein each of the one or more broadband devices is preloaded with a catalog of software components and device functional use cases associated with each software component in the catalog of software components.

14. The system according to claim 11, further comprising:
when a vulnerability is detected, the broadband device is operated in a safe mode.

15. The system according to claim 11, wherein the list of vulnerabilities from the one or more published vulnerability databases is checked against the one or more software components for each of the one or more broadband devices for vulnerabilities at a pre-set interval.

16. The system according to claim 15, wherein the pre-set interval is daily.

17. The system according to claim 11, wherein at least one of the one or more published vulnerability databases is a governmental national vulnerability database.

18. The system according to claim 11, wherein the list of vulnerabilities from the one or more published vulnerability databases is hosted on an in-house server or an in-house cloud server of the cable service provider.

19. The system according to claim 11, wherein a precautionary action to safeguard devices against vulnerability is issued for each of the one or more broadband devices having one or more software components on the list of vulnerabilities from the one or more published vulnerability databases.

20. The system according to claim 11, wherein the one or more software components include open source software, $3^{rd}$ party software, and/or in-house software.

* * * * *